United States Patent
Iyer et al.

(10) Patent No.: US 12,019,639 B2
(45) Date of Patent: Jun. 25, 2024

(54) METHODS AND APPARATUS FOR AUTOMATICALLY PROVIDING PERSONALIZED SEARCH RESULTS

(71) Applicant: Walmart Apollo, LLC, Bentonville, AR (US)

(72) Inventors: Rahul Iyer, Sunnyvale, CA (US); Soumya Wadhwa, Sunnyvale, CA (US); Stephen Dean Guo, Saratoga, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/101,188

(22) Filed: Jan. 25, 2023

(65) Prior Publication Data

US 2023/0161781 A1 May 25, 2023

Related U.S. Application Data

(63) Continuation of application No. 16/526,836, filed on Jul. 30, 2019, now Pat. No. 11,609,919.

(51) Int. Cl.
*G06F 16/24* (2019.01)
*G06F 16/22* (2019.01)
*G06F 16/2457* (2019.01)
*G06F 16/9535* (2019.01)

(52) U.S. Cl.
CPC ........ *G06F 16/24578* (2019.01); *G06F 16/22* (2019.01); *G06F 16/9535* (2019.01)

(58) Field of Classification Search
CPC . G06F 16/24578; G06F 16/22; G06F 16/9535
See application file for complete search history.

(56) References Cited

U.S. PATENT DOCUMENTS

| | | | |
|---|---|---|---|
| 8,521,614 B1 | 8/2013 | Yalamanchi et al. | |
| 9,691,096 B1 * | 6/2017 | Dai | G06Q 30/0631 |
| 10,055,784 B1 | 8/2018 | Boelter et al. | |
| 10,410,224 B1 | 9/2019 | Levanon et al. | |
| 10,467,344 B1 * | 11/2019 | Jade | G06F 40/205 |
| 10,929,392 B1 | 2/2021 | Cheng | |
| 10,997,223 B1 * | 5/2021 | Christodoulopoulos | G06F 40/295 |

(Continued)

*Primary Examiner* — Loc Tran
(74) *Attorney, Agent, or Firm* — Morgan, Lewis & Bockius LLP; Manita Rawat

(57) ABSTRACT

This application relates to apparatus and methods for generating preference profiles that may be used to rank search results. In some examples, a computing device obtains browsing session data and determines items that were engaged, such as items that were viewed or clicked. The computing device obtains item property data, such as product descriptions, for the items, and applies a dependency parser to the item property data to identify portions that include certain words, such as nouns or adjectives, which are then identified as attributes. The computing device generates attribute data identifying portions of the item property data as item attributes. In some examples, the computing device applies one or more machine learning algorithms to the session data and/or search query to identify item attributes. The computing device may generate a profile that includes the item attributes, and may rank search results based on the attribute data, among other uses.

20 Claims, 9 Drawing Sheets

(56) References Cited

U.S. PATENT DOCUMENTS

| | | | |
|---|---|---|---|
| 2016/0171974 A1* | 6/2016 | Hannun | G06N 3/084 704/232 |
| 2016/0364393 A1 | 12/2016 | Zhang et al. | |
| 2018/0068371 A1 | 3/2018 | Krishnamurthy et al. | |
| 2018/0121799 A1 | 5/2018 | Hashimoto et al. | |
| 2018/0203848 A1 | 7/2018 | Perez et al. | |
| 2018/0285186 A1 | 10/2018 | Godefroid et al. | |
| 2019/0156220 A1 | 5/2019 | Zhu et al. | |
| 2019/0188295 A1* | 6/2019 | Sirotkovic | G06F 16/2425 |
| 2019/0213601 A1 | 7/2019 | Hackman et al. | |
| 2020/0226126 A1 | 7/2020 | Zou et al. | |
| 2020/0380991 A1 | 12/2020 | Ge et al. | |

* cited by examiner

METHODS AND APPARATUS FOR AUTOMATICALLY PROVIDING PERSONALIZED SEARCH RESULTS

CROSS-REFERENCE TO RELATED APPLICATION

This application is a continuation of U.S. patent application Ser. No. 16/526,836, filed Jul. 30, 2019, and entitled "Methods And Apparatus For Automatically Providing Personalized Search Results," which is incorporated herein in its entirety by reference.

TECHNICAL FIELD

The disclosure relates generally to network services and, more specifically, to automatically determining and providing network search results.

BACKGROUND

At least some websites, such as retailer websites, allow a visitor to search for items. For example, the website may include a search bar that allows the visitor to enter search terms, such as one or more words, that the website uses to search for items. In response to the search terms, the website may display search results with items that meet the requirements of the search algorithm implemented by the website. For example, the search results may identify items that are offered for purchase by the retailer. These search results, however, have drawbacks. For example, although the website may return similar search results to different visitors entering the same search terms, not all visitors entering the same search term are searching for or interested in the same items. In some examples, a website visitor conducting a search may need to peruse through may search result items before locating the item they are interested in. Moreover, a website visitor may want to relocate an item that the visitor has searched or even purchased during a browsing session. For example, after viewing a search result that included the item, the visitor may have performed a different search, or may have visited a different webpage of the website. As such, the website visitor may need to reenter similar search terms to relocate the item. As such, there are opportunities to address the presentation of search results to website visitors.

SUMMARY

The embodiments described herein are directed to automatically determining and providing network search results in response to a search request that may be displayed, for example, on a website. The embodiments may allow a customer to be presented with search results that interest the customer. For example, the embodiments may allow the customer to view search results based upon that customer's previous or current activity with the website, transaction history, or preferences. In some examples, the embodiments may employ one or more machine learning processes to determine the search results. As a result, the embodiments may allow a retailer to present more relevant search results to each customer. The embodiments may also allow a retailer to present items the customer may be interested in earlier in a search result listing. As a result, the customer may more quickly locate an item of interest, which may save the customer time as well as encourage the customer to purchase the item. In addition, because a customer may now spend less time searching for an item, the customer may have additional time to consider additional items for purchase. In addition to or instead of these example advantages, persons of ordinary skill in the art would recognize and appreciate other advantages as well.

In accordance with various embodiments, exemplary systems may be implemented in any suitable hardware or hardware and software, such as in any suitable computing device. For example, in some embodiments, a computing device is configured to obtain session data identifying engagement of at least one item. For example, the session data may indicate that a user has viewed or clicked the item on a website. The computing device obtains item property data for the item, which may be obtained from an item catalog stored in a database. The computing device determines at least portions of the item property data based on application of a dependency parser to the item property data, and generates attribute data identifying at least one attribute of the item based on the determined portions of the property data. In some examples, the computing device receives a search request identifying a plurality of search terms from a web server. The computing device determines at least a portion of the plurality of search terms based on applying the dependency parser to the plurality of search terms, and generates attribute data identifying at least another attribute of the item based on the determined portions of the plurality of search terms. The computing device may store the attribute data in a database, and may use the attribute data to rank search results.

In some embodiments, a method is provided that includes obtaining session data identifying engagement of at least one item. The method includes obtaining item property data for the item, which may be obtained from an item catalog stored in a database. The method includes determining at least portions of the item property data based on application of a dependency parser to the item property data, and generating attribute data identifying at least one attribute of the item based on the determined portions of the property data. In some examples, the method includes receiving a search request identifying a plurality of search terms from a web server. The method may further include determining at least a portion of the plurality of search terms based on applying the dependency parser to the plurality of search terms, and generating attribute data identifying at least another attribute of the item based on the determined portions of the plurality of search terms. In some examples, the method includes storing the attribute data in a database, and ranking search results based on the attribute data.

In yet other embodiments, a non-transitory computer readable medium has instructions stored thereon, where the instructions, when executed by at least one processor, cause a computing device to perform operations that include obtaining session data identifying engagement of at least one item. The operations include obtaining item property data for the item, which may be obtained from an item catalog stored in a database. The operations include determining at least portions of the item property data based on application of a dependency parser to the item property data, and generating attribute data identifying at least one attribute of the item based on the determined portions of the property data. In some examples, the operations include receiving a search request identifying a plurality of search terms from a web server. The operations may further include determining at least a portion of the plurality of search terms based on applying the dependency parser to the plurality of search terms, and generating attribute data identifying at least another attribute of the item based on the determined portions of the plurality of search terms. In some examples, the operations include storing the attribute data in a database, and ranking search results based on the attribute data.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
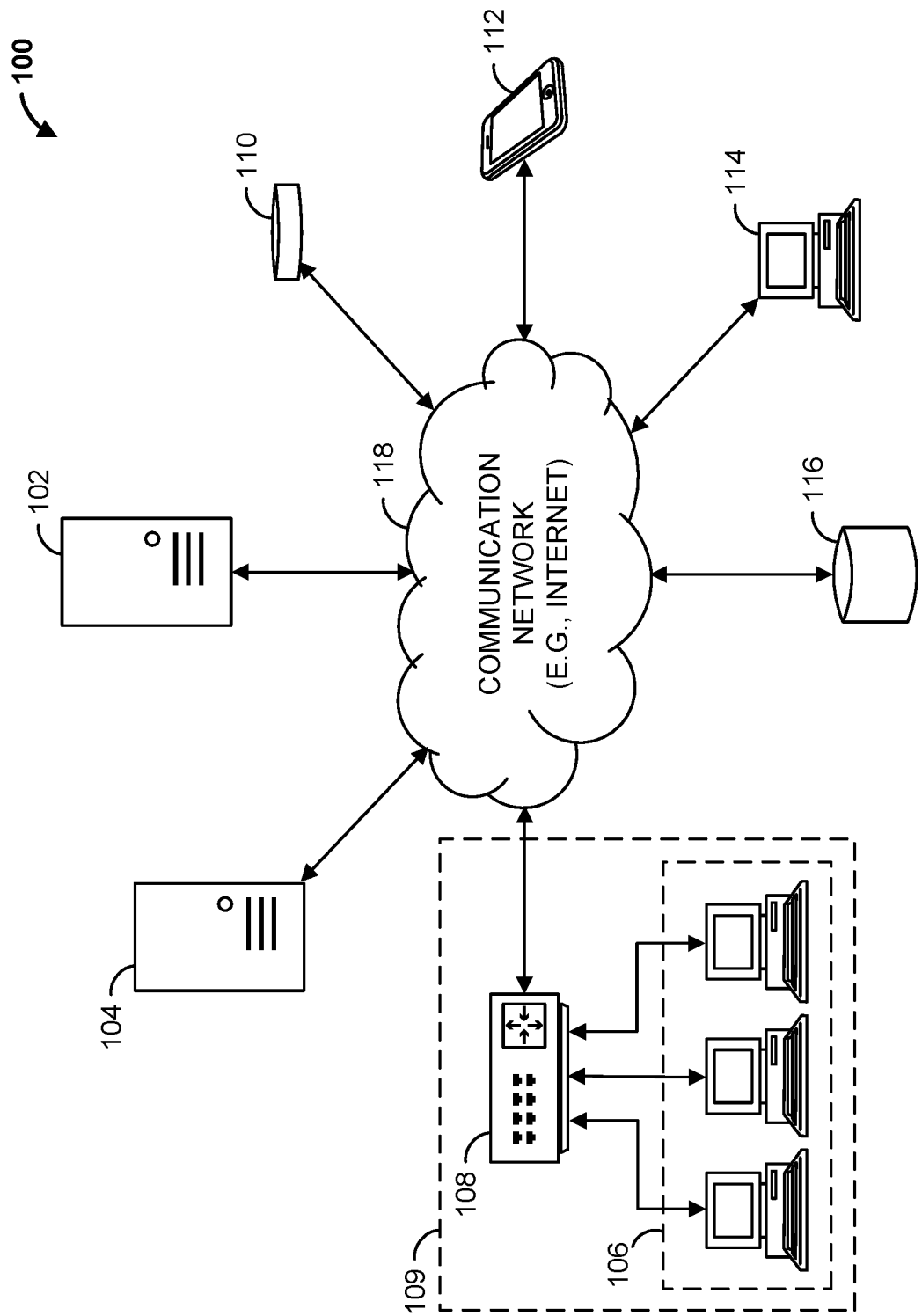
FIG. 1 is a block diagram of a search result customization system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a search result customization system 100 that includes a search result customization computing device 102 (e.g., a server, such as an application server), a server 104 (e.g., a web server), workstation(s) 106, database 116, and multiple customer computing devices 110, 112, 114 operatively coupled over network 118. Search result customization computing device 102, workstation(s) 106, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, search result customization computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, search result customization computing device 102 is operated by a retailer, and multiple customer computing devices 112, 114 are operated by customers of the retailer.

Although FIG. 1 illustrates three customer computing devices 110, 112, 114, search result customization system 100 can include any number of customer computing devices 110, 112, 114. Similarly, search result customization system 100 can include any number of workstation(s) 106, search result customization computing devices 102, servers 104, and databases 116.

Workstation(s) 106 are operably coupled to communication network 118 via router (or switch) 108. Workstation(s) 106 and/or router 108 may be located at a store 109, for example. Workstation(s) 106 can communicate with search result customization computing device 102 over communication network 118. The workstation(s) 106 may send data to, and receive data from, search result customization computing device 102. For example, the workstation(s) 106 may transmit data related to an order purchased by a customer at store 109 to search result customization computing device 102. In response, search result customization computing device 102 may transmit an indication of one or more item reviews to provide to the purchasing customer. For example, the item reviews may be displayed on a receipt handed to the customer for the purchase order.

In some examples, server 104 may be a web server and host one or more web pages, such as a retailer's website. Web server 104 may transmit data related to an order purchased on the website by a customer to search result customization computing device 102. In response, search result customization computing device 102 may transmit an indication of one or more item reviews to display on the web site to the purchasing customer. For example, the item reviews may be displayed on a webpage dedicated to an item when the customer is browsing that webpage.

First customer computing device 110, second customer computing device 112, and Nh customer computing device 114 may communicate with web server 104 over communication network 118. For example, each of multiple computing devices 110, 112, 114 may be operable to view, access, and interact with a website hosted by web server 104. In some examples, web server 104 hosts a website for a retailer that allows for the purchase of items. For example, the website may list prices for advertised items. An operator of one of multiple computing devices 110, 112, 114 may access the web site and perform a search for items on the website. In response, the web site may return search results identifying one or more items. The website may allow the operator to add one or more of the items to an online shopping cart, and allow the operator to perform an online checkout of the shopping cart to purchase the items.

Search result customization computing device 102 is operable to communicate with database 116 over communication network 118. For example, search result customization computing device 102 can store data to, and read data from, database 116. Database 116 can be a remote storage device, such as a cloud-based server, a memory device on another application server, a networked computer, or any other suitable remote storage. Although shown remote to search result customization computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Search result customization computing device 102 may generate, in response to a search query by a customer, search results tailored to that customer. The search results may be ranked and displayed according to the ranking. In some examples, to generate the search results, search result customization computing device 102 obtains user session data identifying a user's engagement with a website, such as a website hosted by web server 104, during one or more browsing sessions of the website. For example, web server 104 may store in database 116 items a user clicks on (e.g., item images clicked on by the user), items a user has added to an online shopping cart, or advertisements for an item viewed or clicked on by the user.

Search result customization computing device 102 may obtain the user session data, and identify attributes of the items corresponding to the user session data. Attributes may identify any feature, keyword, type, brand, option, any other property of the item (e.g., any data that is associated with the item), or any other type of attribute in a corresponding attribute category. For example, for food items, attributes may identify brands, flavors, food forms, container types, quantity, count, size, nutrients, or restrictions.

In some examples, search result customization computing device 102 determines attributes for the items based on catalog data stored in database 116. Catalog data may identify any attribute of an item, and may be tagged as such (e.g., identified as an attribute of an item). For example, search result customization computing device 102 may identify an item that was clicked on by the user, and obtain attributes for that item from catalog data stored in database 116. As another example, search result customization computing device 102 may identify an item for which a user viewed an advertisement for, and may obtain attributes for that item from database 116. Search result customization computing device 102 may then associate the customer with any identified attributes.

Catalog data may also include a description of an item, a description of any attribute of the item, or any other description related to the item. In these examples, search result customization computing device 102 may employ one or more syntactic rules, such as by applying a dependency parser, or a part-of-speech tagger, to identify (e.g., tag) words or phrases of the description, such as nominal subjects and corresponding sibling adjectives, as well as nouns with corresponding adjective modifiers. Search result customization computing device 102 may then identify any of the tagged words or phrases as an attribute. For example, a product description may include one or more features of the item. Search result customization computing device 102 may apply a part-of-speech tagger to the product description, and tag nouns and adjective modifiers as attributes. Search result customization computing device 102 may then associate the customer with any identified attributes.

Search result customization computing device 102 may also obtain search requests for the customer. For example, the customer may initiate a search request by entering in search terms in a search bar on the website. Web server 104 may transmit the search terms to search result customization computing device 102. Upon receiving the search terms, search result customization computing device 102 may employ one or more syntactic rules, such as by applying a dependency parser, or a part-of-speech tagger, to identify words or phrases of the search terms. Search result customization computing device 102 may then identify any of the tagged words or phrases as an attribute, and associate the customer with the attributes.

In some examples, search result customization computing device 102 determines attributes for a customer based on the application of one or more machine learning methods. For example, result customization computing device 102 may obtain user session data for a customer, and determine one or more items associated with the user session data (e.g., an item the customer clicked on or added to an online shopping cart). Result customization computing device 102 may then obtain catalog data for the identified items, such as title and description for each item. Result customization computing device 102 may then generate word embeddings for the items based on applying a neural network, such as a named-entity recognition neural network (e.g., Word2Vec, GloVe, ELMo), to the obtained catalog data. Search result customization computing device 102 may also obtain user query data for a customer identifying one or more customer search queries, and may apply the neural network to the search terms in the search queries to generate word embeddings for the search terms.

In addition, result customization computing device 102 may generate character embeddings based on applying a character-based neural network (CNN) to the same obtained catalog data for the items. For example, for each word embedding, a corresponding character embedding is generated. Result customization computing device 102 then applies a deep neural network, such as a bidirectional symmetrical deep neural network, to encode (e.g., concatenate) each word embedding with its corresponding character embedding. For example, by applying the deep neural network, result customization computing device 102 may encode each word embedding and corresponding character embedding into a single condensed vector.

Result customization computing device 102 may then apply a recurrent neural network, such as a bi-directional long short-term memory (Bi-LSTM) neural network, to the output of the deep neural network (e.g., the concatenated word and character embeddings) to generate representations for the encoded word and character embeddings. For example, result customization computing device 102 may generate output matrix data identifying and characterizing the output result (i.e., classification output) of applying a Bi-LSTM neural network to the output of the deep neural network.

For example, assume an input sentence defined by array $X=(x_1, x_2, \ldots, X_n)$, where there are n elements of array X, each element representing a word. In addition, assume output matrix P represents the output of the Bi-LSTM neural network when applied to the input sentence identified by array X. Output matrix P has dimensions n by k (i.e., n×k), where n represents the number of elements in array X, and k represents the number of distinct tags, in this example, tagged attributes. Each element of output matrix P, identified by $P_{i,j}$, corresponds to a score of the $j^{th}$ tag for an $i^{th}$ word of array X. For a sequence of label predictions (e.g., predefined label predictions) defined by $y=(Y_1 Y_2, \ldots, Yn)$, a score based on array X and output matrix P may be determined according to the equation below:

$$s(X,y) = \Sigma_{i=0}^{n} A_{y_i, y_{i+1}} + \Sigma_{i=1}^{n} P_{i, y_i} \quad \text{(eq. 1)}$$

where:

A is a matrix of transition scores such that $A_{i,j}$ represents a probability of transition from tag i to tag j;

Result customization computing device 102 may further apply a softmax algorithm over all possible tag sequences to yield a probability for the sequence of label predictions y as given by the equation below:

$$p(x \mid X) = \frac{e^{S(X,y)}}{\Sigma_{\tilde{y} \in Y_x} e^{S(S, \tilde{y})}} \quad \text{(eq. 2)}$$

The log of these probabilities may be maximized during training of a statistical modeling method, such as conditional random field (CRF) model, which may be employed to predict the sequence of label predictions y.

Result customization computing device 102 may apply the statistical modeling method to the resultant output of the Bi-LSTM neural network (e.g., output matrix P) to identify attributes to be associated with the customer. In some examples, result customization computing device 102 trains a CRF model by maximizing a log-probability of correct tag sequences. For example, the log-probability of correct tag sequences may be maximized according to the equation below:

$$\log(p(y \mid X)) = \quad \text{(eq. 3)}$$
$$s(X, y) - \log(\Sigma_{\tilde{y} \in Y_x} e^{s(X, \tilde{y})}) = S(X, y)_{\tilde{y} \in Y_x} \text{logadd } s(X, \tilde{y})$$

where:

$Y_x$ represents all possible tag sequences for sequence X.

While decoding sequence X, result customization computing device 102 predicts an output sequence Y that obtains a maximum score, such as a maximum score. For example, result customization computing device 102 may employ a CRF model that includes a Viterbi algorithm for decoding to obtain maximum scores given by the equation below:

$$Y^* = \underset{\tilde{y} \in Y_x}{\operatorname{argmax}} s(X, \tilde{y}). \quad \text{(eq. 4)}$$

In some examples, result customization computing device 102 generates user preference data (e.g., a website profile) for a customer based on the attributes associated with that customer. For example, the user preference data may identify and characterize attributes associated with a customer during a browsing session of a website. In some examples, more than one attribute per attribute category (e.g., brand, type, description) may be identified. When generating user preference data for a user, result customization computing device 102 may determine, for each attribute category, an attribute that is identified most often (i.e., a majority attribute). The attribute defined most often in each attribute category is stored as part of that customer's user preference data. In some examples, a percentage score is generated for each attribute within an attribute category, and the percentage score is stored as part of the customer's user preference data. The percentage score is based on a number of times a particular attribute is identified in a corresponding attribute category with respect to the number of times any attribute is identified in that attribute category. In some examples, result customization computing device 102 stores customers' user preference data in database 116.

Result customization computing device 102 may then provide customized search results based on the generated user preference data for a particular customer. For example, web server 104 may transmit a search request to result customization computing device 102 identifying and characterizing a search query for a particular customer browsing a website. Result customization computing device 102 may identify one or more items with attributes in common with those indicated by that customer's user preference data. For example, result customization computing device 102 may rank items based on how many attributes that have in common with the user preference data for that customer. Result customization computing device 102 may transmit a message to web server 104 identifying the search results, and web server 104 may display the search results on the website viewed by the customer. In some examples, once a user profile is generated, which may contain an affinity towards certain attributes, attributes may be extracted from items in the search results as well. Result customization computing device 102 may identify items that correspond to (e.g., match) the user's generated profile, which can dynamically change depending on a user session (e.g., a user browsing session).

In some examples, result customization computing device 102 executes one or more search algorithms based on the user preference data for the particular customer to generate search results. In some examples, result customization computing device 102 generates a ranking of orders previously purchased by the customer based on the user preference data for that customer. In some examples, result customization computing device 102 determines (e.g., recommends) substitute items for a user when a particular item is out of stock based on the user preference data for that customer. In some examples, result customization computing device 102 may employ the processes described herein in targeted ad campaigns, the recommendations of products, or overcoming cold-start problems where a user does not have any, or a lot of, purchase history.

Figure 2:
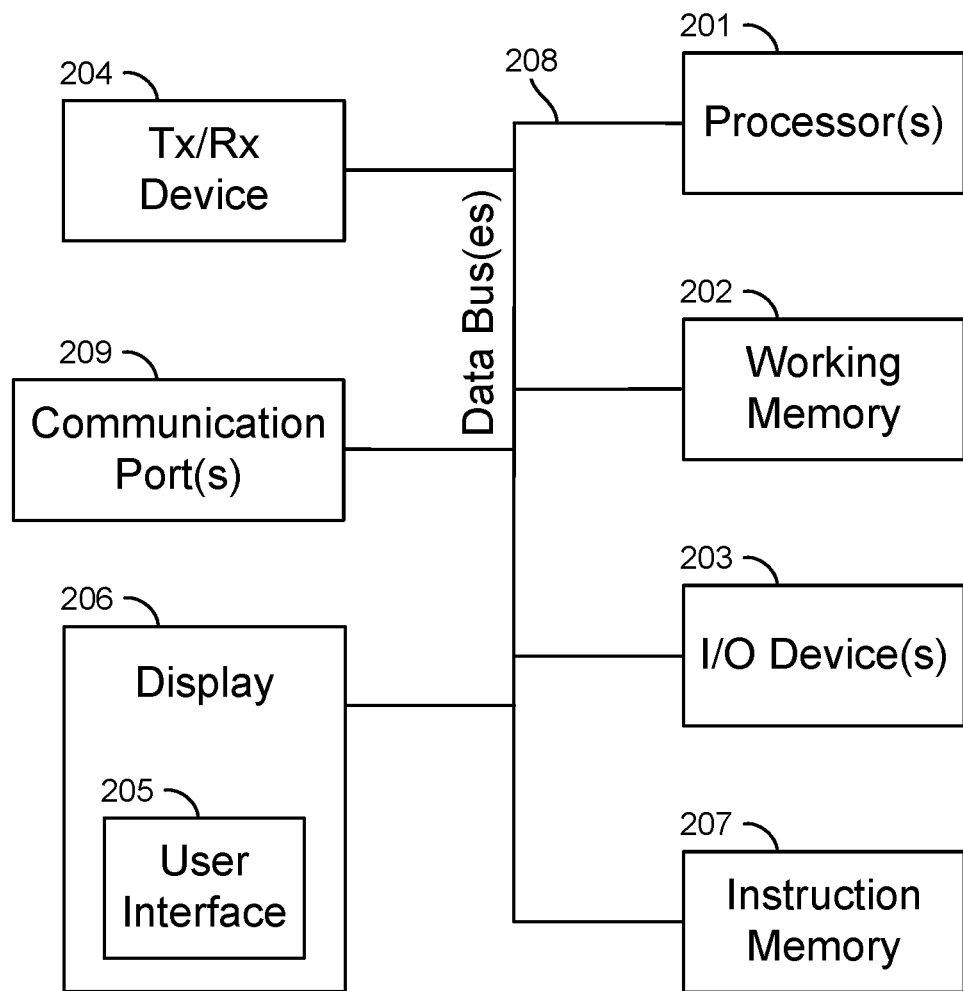
FIG. 2 is a block diagram of the search result customization computing device of the search result customization system of FIG. 1 in accordance with some embodiments.

FIG. 2 illustrates the search result customization computing device 102 of FIG. 1. Search result customization computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of search result customization computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with search result customization computing device 102. For example, user interface 205 can be a user interface for an application of a retailer that allows a customer to view and interact with a retailer's website. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 search result customization computing device 102 will be operating in. Processor(s) 201 is operable to receive data from, or send data to, a network, such as communication network 118 of FIG. 1, via transceiver 204.

Figure 3:
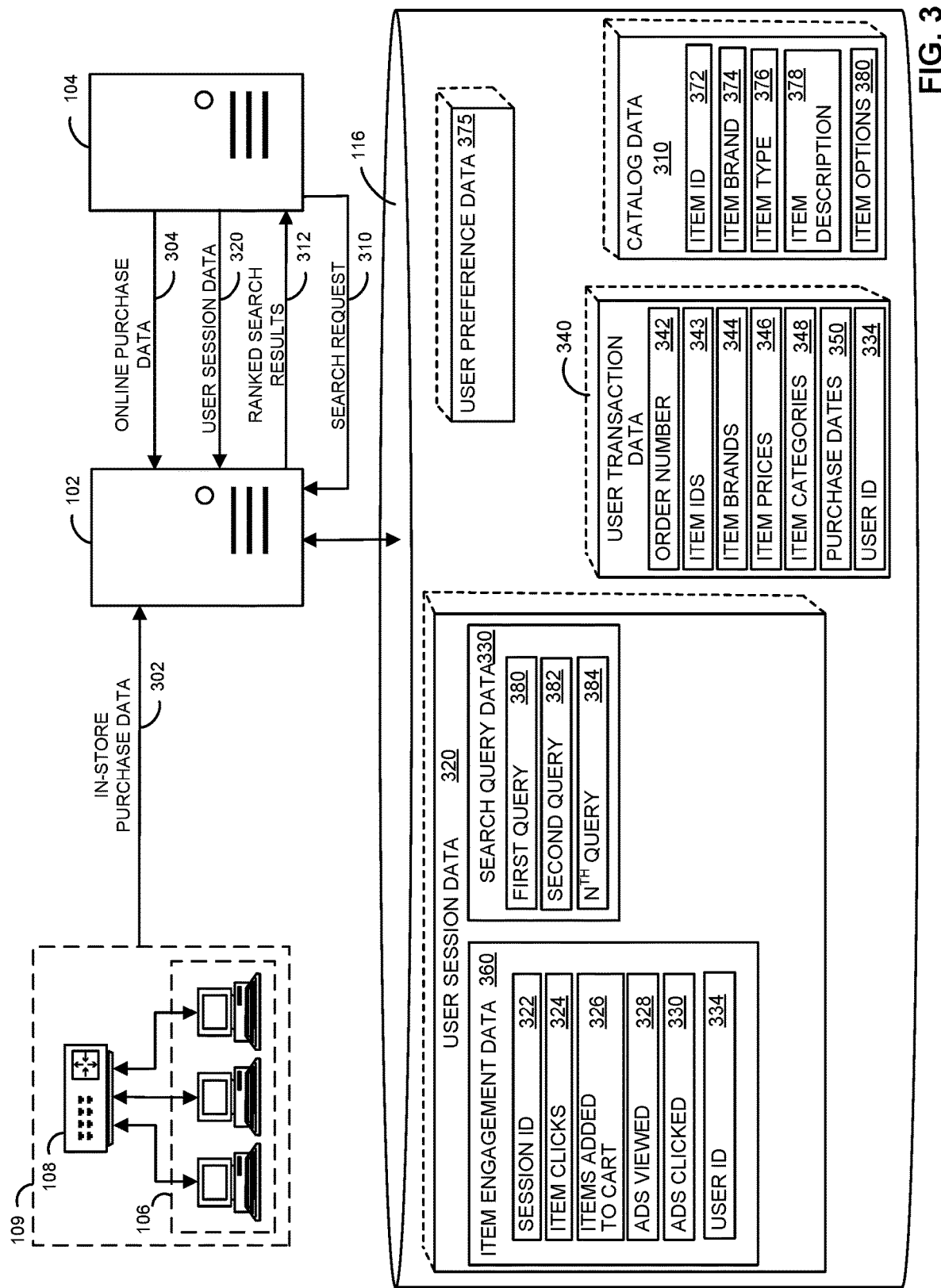
FIG. 3 is a block diagram illustrating examples of various portions of the search result customization system of FIG. 1 in accordance with some embodiments.

FIG. 3 is a block diagram illustrating examples of various portions of the search result customization system 100 of FIG. 1. As indicated in the figure, search result customization computing device 102 may receive user session data 320 from web server 104, and store user session data 320 in database 116. User session data 320 identifies, for each user, data related to a browsing session, such as when browsing a retailer's webpage hosted by web server 104. In this example, user session data 320 includes item engagement data 360 and search query data 330. Item engagement data 360 includes a session ID 322 (i.e., a website browsing session identifier), item clicks 324 identifying items which the user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 330 identifying advertisements the user clicked on, and user ID 334 ID (e.g., a customer ID, retailer website login ID, etc.). Search query data 330 identifying one or more searches conducted by a user during a browsing session (e.g., a current browsing session). In this example, search query data 330 includes first query 380, second query 382, and N$^{th}$ query 384.

Search result customization computing device 102 may also receive in-store purchase data 302 identifying and characterizing one or more purchases from one or more stores 109. Similarly, search result customization computing device 102 may receive online purchase data 304 from web server 104, which identifies and characterizes one or more online purchases, such as from a retailer's website. Search result customization computing device 102 may parse in-store purchase data 302 and online purchase data 304 to generate user transaction data 340. In this example, user transaction data 340 may include an order number 342 identifying a purchase order, item IDs 343 identifying one or more items purchased in the purchase order, item brands 344 identifying a brand for each item purchased, item prices 346 identifying the price of each item purchased, item category 348 identifying a category of each item purchased, a purchase date 350 identifying the purchase date of the purchase order, and user ID 334 for the user making the corresponding purchase.

Database 116 also stores catalog data 310, which may identify one or more attributes of a plurality of items, such as a portion of or all items a retailer carries. Catalog data 310 may identify, for each of the plurality of items, an item ID 372 (e.g., an SKU number), item brand 374, item type 376 (e.g., grocery item such as milk, clothing item), item description 378 (e.g., a description of the product including product features, such as ingredients, benefits, use or consumption instructions, or any other suitable description), and item options 380 (e.g., item colors, sizes, flavors, etc.).

In some examples, search result customization computing device 102 may receive a search request 310 identifying and characterizing a search query for a user. The search query may include data identifying and characterizing one or more words, for example. Based on one or more of user session data 320, user transaction data 340, and search request 310, search result customization computing device 102 may determine one or more attributes to be associated with a user. For example, search result customization computing device 102 may determine one or more items associated with user session data 320 or user transaction data 340, and obtain one or more attributes for the item from catalog data 310.

In some examples, search result customization computing device 102 applies a dependency parser, or a part-of-speech tagger, to catalog data 310, such as to item description 378, to identify (e.g., tag) words or phrases as attributes. Similarly, search result customization computing device 102 applies a dependency parser, or a part-of-speech tagger to search queries identified by search request 310 to identify words or phrases of the search query as attributes.

Based on the identified attributes for the user, search result customization computing device 102 may generate user preference data 375 for a corresponding user. For example, user preference data 375 may identify a website profile for the user that includes the identified attributes. Search result customization computing device 102 may store user preference data 375 in database 116.

In some examples, search result customization computing device 102 determines attributes for a customer based on the application of one or more machine learning methods. For example, result customization computing device 102 may generate word embeddings, and character embeddings, based on item attributes for items associated with user session data 320, user transaction data 340, and corresponding catalog data 310 for the items. Result customization computing device 102 then applies a deep neural network, such as a bidirectional symmetrical deep neural network, to combine each word embedding with its corresponding character embedding. Result customization computing device 102 then applies a recurrent neural network, such as a bi-directional long short-term memory (Bi-LSTM) neural network, to the output of the deep neural network to generate representations for each word. Result customization computing device 102 applies a statistical modeling method, such as CRF model, to the word representations to identify attributes to be associated with the user. Result customization computing device 102 may store the identified attributes for the user in database 116 as user preference data 375.

Search result customization computing device 102 may rank search results for a user based on user preference data 375 for that user. For example, during a current browsing session, search result customization computing device 102 may receive a search request 310 from web server 104. Upon receiving the search request 310, search result customization computing device 102 determine one or more items responsive to the search request 310 based on user preference data 375 for the user requesting search request 310. For example, search result customization computing device 102 may execute one or more search result algorithms to locate a pool of items responsive to the search request 310. Search result customization computing device 102 may then rank the items based on user preference data 310, such as by ranking items that have more attributes in common with user preference data 310 ahead of others that do not have as many attributes in common. Search result customization computing device 102 may then transmit ranked search results 312 to web server 104 identifying and characterizing the ranked items.

In some examples, search result customization computing device 102 applies a weighting to each attribute. For example, search result customization computing device 102 may apply a higher weighting to attributes considered more important than others. Search result customization computing device 102 then ranks the items based on the weighted attributes.

Figure 4A:
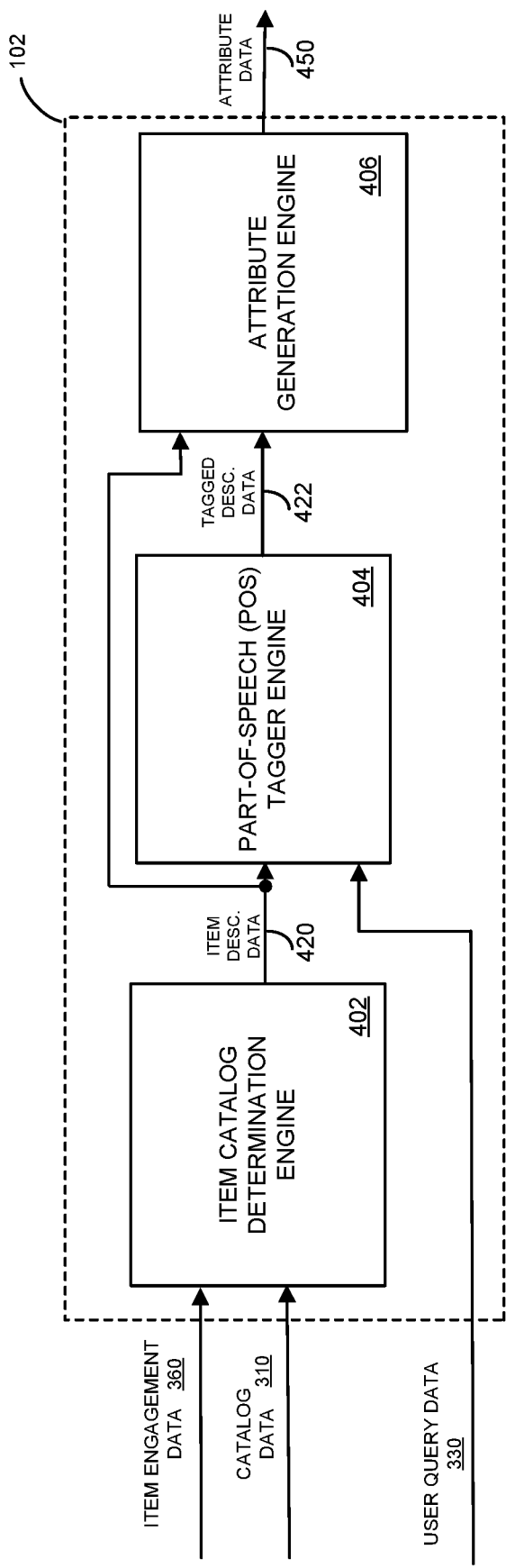
FIG. 4A is a block diagram illustrating examples of various portions of the search result customization computing device of FIG. 1 in accordance with some embodiments.
Figure 4B:
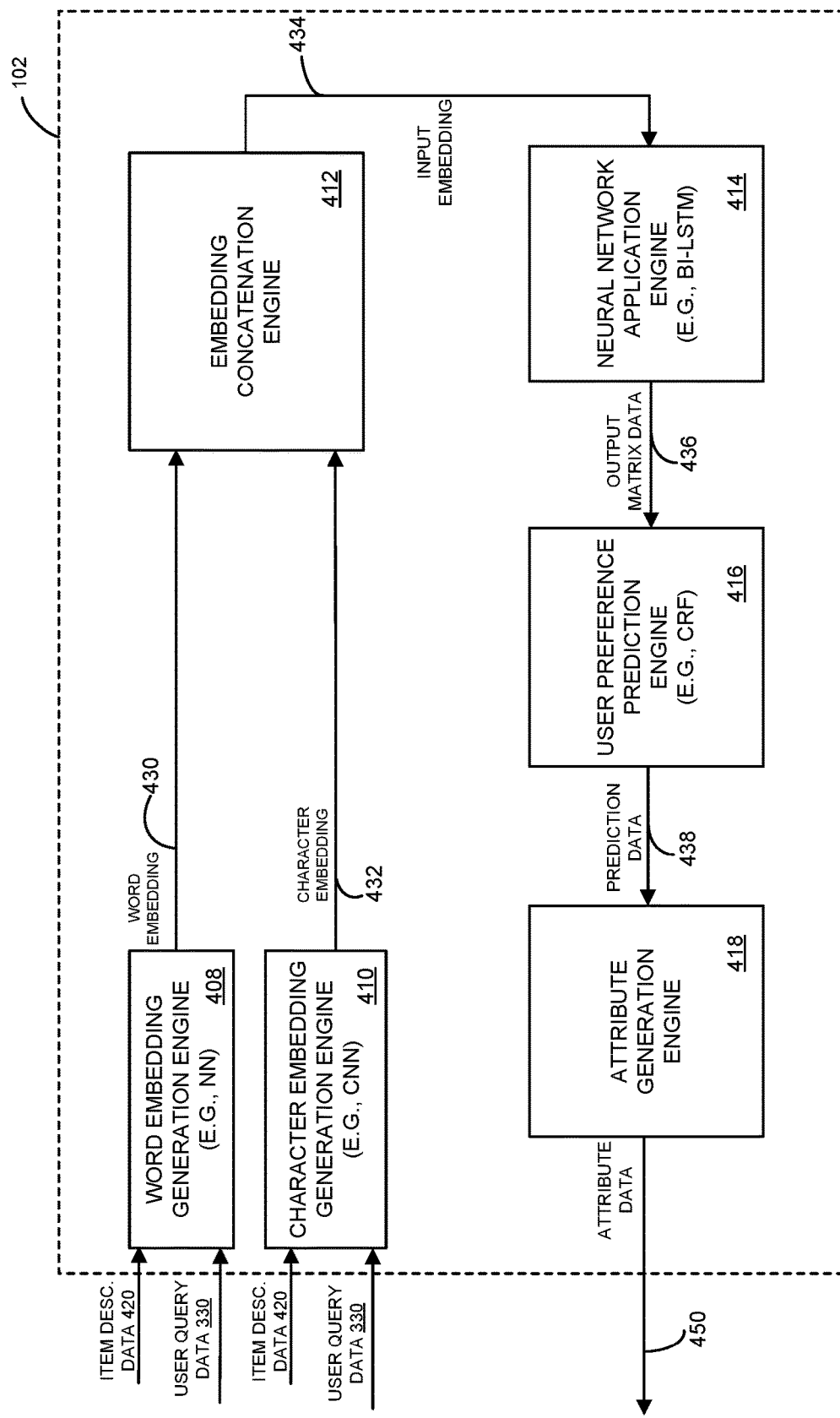
FIG. 4B is a block diagram illustrating examples of various portions of the search result customization computing device of FIG. 1 in accordance with some embodiments.

FIGS. 4A and 4B illustrate examples of various portions of the search result customization computing device 102 of FIG. 1. As indicated in FIG. 4A, search result customization computing device 102 includes item catalog determination engine 402, part-of-speech tagger engine 404, and attribute generation engine 406. As illustrated in FIG. 4B, search result customization computing device 102 also includes word embedding generation engine 408, character embedding generation engine 410, embedding concatenation engine 412, neural network application engine 414, user preference prediction engine 416, and attribute generation engine 418. In some examples, one or more of item catalog determination engine 402, part-of-speech tagger engine 404, attribute generation engine 406, embedding generation engine 408, character embedding generation engine 410, embedding concatenation engine 412, neural network application engine 414, user preference prediction engine 416, and attribute generation engine 418 may be implemented in hardware. In some examples, one or more of item catalog determination engine 402, part-of-speech tagger engine 404, attribute generation engine 406, embedding generation engine 408, character embedding generation engine 410, embedding concatenation engine 412, neural network application engine 414, user preference prediction engine 416, and attribute generation engine 418 may be implemented as an executable program maintained in a tangible, non-transitory memory, such as instruction memory 207 of FIG. 2, that may be executed by one or processors, such as processor 201 of FIG. 2.

Referring to FIG. 4A, item catalog determination engine 402 receives item engagement data 330, and can determine one or more items associated with item engagement data 360. Item catalog determination engine 402 may then obtain catalog data 310, such as from database 116, for the items determined, and generate item description data identifying various properties (e.g., words, descriptions) of the item based on the obtained catalog data 310.

Part-of-speech tagger engine 404 may receive item description data 420 from item catalog determination engine 402, and apply a part-of-speech tagger to at least portions of item description data 420 to tag words or phrases, such as nouns and adjectives. Part-of-speech tagger engine 404 may also receive user query data 330 from web server 104, and apply the part-of-speech tagger to search queries identified by user query data 330. Part-of-speech tagger engine 404 may generate tagged description data 422 identifying and characterizing the tagged words or phrases, and provide tagged description data 422 to attribute generation engine 406.

Attribute generation engine 406 may receive at least portions of item description data 420 (e.g., attributes that are identified by catalog data 310), and tagged description data 422. Attribute generation engine 406 may generate attribute data 450 identifying and characterizing attributes based on the portions of item description data 420 and tagged description data 422. Search result customization computing device 102 may store attribute data 450 in database 116 as user preference data 312, and may employ user preference data 312 to determine ranked search results 312 in response to a search request 310, for example.

In some examples, and referring to FIG. 4B, word embedding generation engine 408 may receive item description data 420 from item catalog determination engine 402, and user query data from web server 104. Word embedding engine 408 may generate word embeddings 430 based on the application of a neural network to at least portions of item description data 420 and user query data 330. Character embedding generation engine 410 may also receive item description data 420 from item catalog determination engine 402, and user query data 330 from web server 104. Character embedding generation engine 410 generates character embeddings 432 based on, for example, the application of a CNN to receive item description data 420 and user query data 330.

Embedding concatenation engine 412 receives word embeddings 430 and character embeddings 432, and applies a deep neural network, such as a bidirectional symmetrical deep neural network, to corresponding word embedding 430 and character embeddings 432 thereby generating input embeddings 434. Each input embedding 434 may be an encoded vector based on a word embedding and corresponding character embedding, for example.

Neural network application engine 414 applies a recurrent neural network, such as a Bi-LSTM neural network, to the input embeddings 434, and generates output matrix data 436. User preference prediction engine then applies one or more statistical modeling methods, such as a CRF model, to output matrix data 436, and generates prediction data 438 that identifies and characterizes predicted attributes. Attribute generation engine 418 receives prediction data 438, and determines corresponding attributes to be associated with the user. Attribute generation engine 418 generates attribute data 450, which identifies and characterizes the attributes. Search result customization computing device 102 may store attribute data 450 in database 116 as user preference data 312, and may employ user preference data 312 to determine ranked search results 312 in response to a search request 310, for example.

Figure 5A:
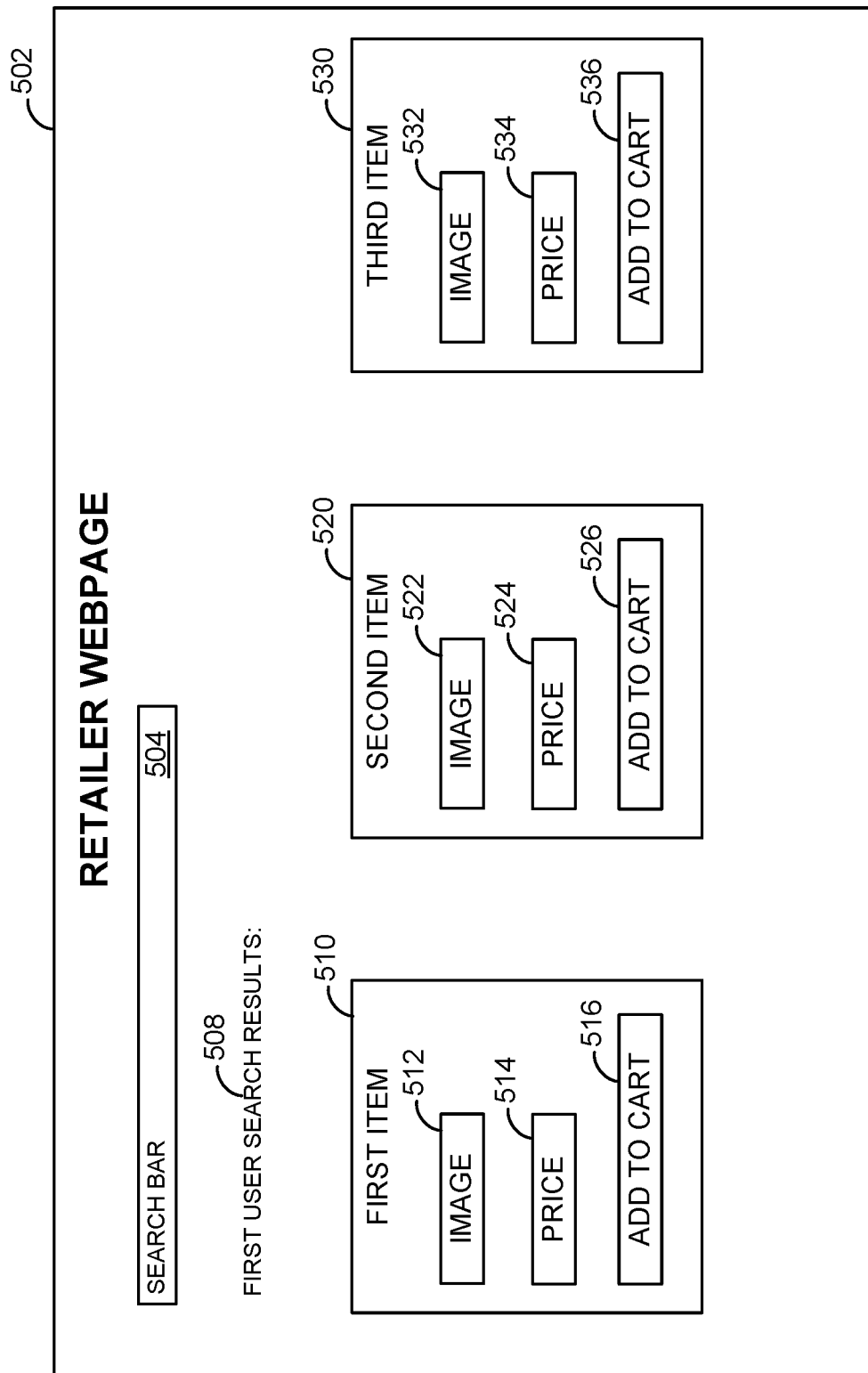
FIG. 5A is an example webpage displaying search results for a first user in accordance with some embodiments.
Figure 5B:
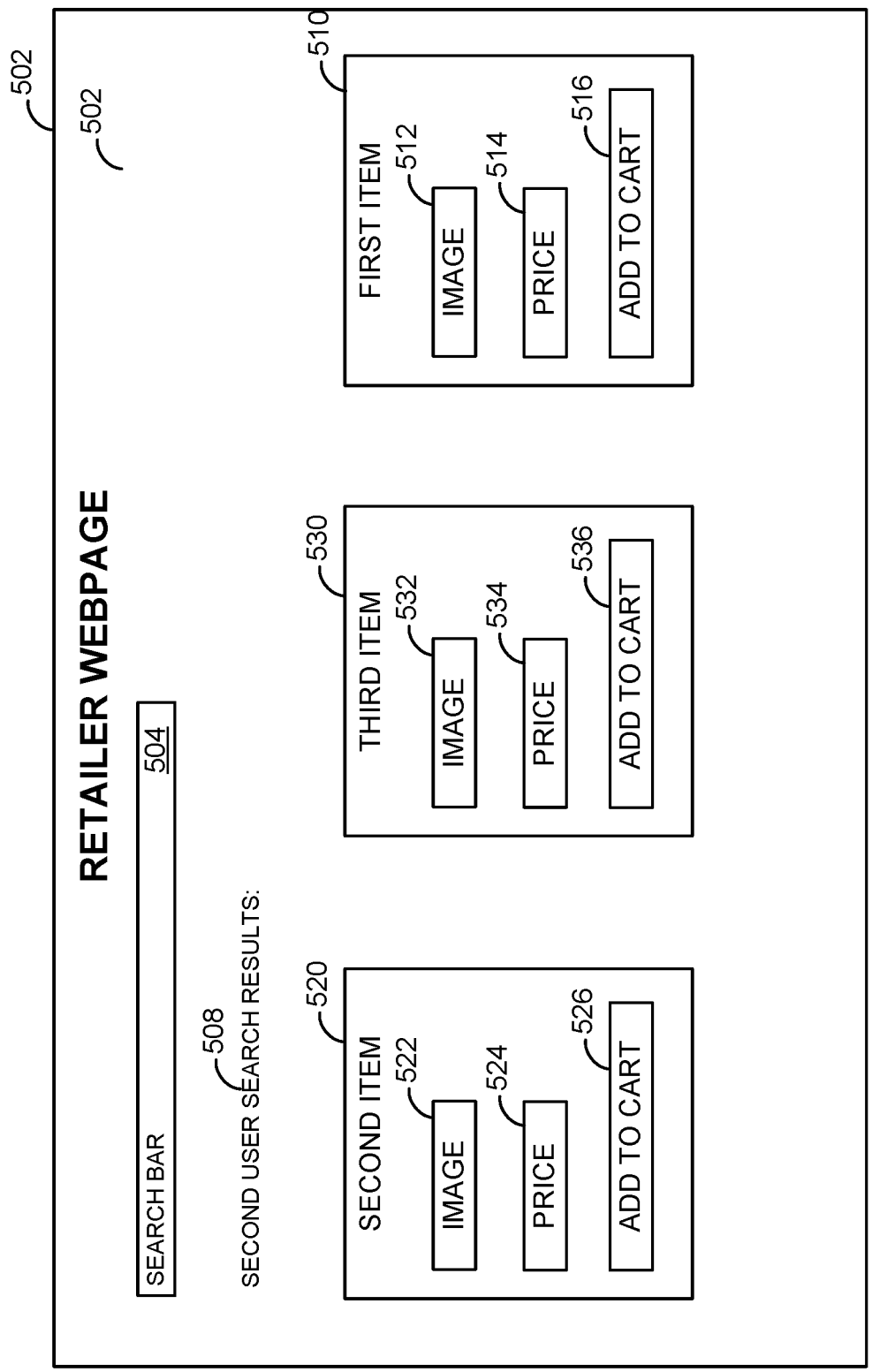
FIG. 5B is an example webpage displaying search results for a second user in accordance with some embodiments.

FIGS. 5A and 5B illustrate example webpages 502 displaying varying search results for a first user and a second user, respectively. For example, and with reference to FIG. 5A, a first user operating one of multiple customer computing devices 110, 112, 114 may access a web site hosted by web server 104. The first user may execute a search on the web site, for example, via search bar 504. In response, web server 104 may transmit a search request 310 to search result customization computing device 102. In response, search result customization computing device 102 may generate attribute data 450 based on the search request 310. Attribute data 450 may also include attributes for the first user based on previous search queries, user session data 320, or user transaction data 340 for the first user. Search result customization computing device 102 may then execute one or more search result algorithms to locate a pool of items responsive to the search request 310, and rank the items based on attribute data 450. Search result customization computing device 102 may then generate ranked search results 312 identifying and characterizing the ranked list of search results, and transmit ranked search results 312 to web server 104 to display the identified search results to the first user.

In this example, FIG. 5A illustrates first user search results 508 that includes, in order, a first item 510, a second item 520, and a third item 530. Each item includes an image, a price, and an add-to-cart icon that allows for the first user to add the item for purchase to an online shopping cart associated with web page 502. In this example, first item 510 includes image 512, price 514, and add to cart icon 516. Similarly, second item 520 includes image 522, price 524, and add to cart icon 526, and third item 530 includes image 532, price 534, and add to cart icon 536.

FIG. 5B, however, illustrates second user search results 508 for a second user entering in a same or similar search request via search bar 504. In this example, because generated attribute data 450 for the second user identified varying attributes than those identified for the first user in FIG. 5A, the search results are ranked differently. Specifically, second user search results 508 identify, in order, second item 520, third item 530, and first item 510.

Figure 6:
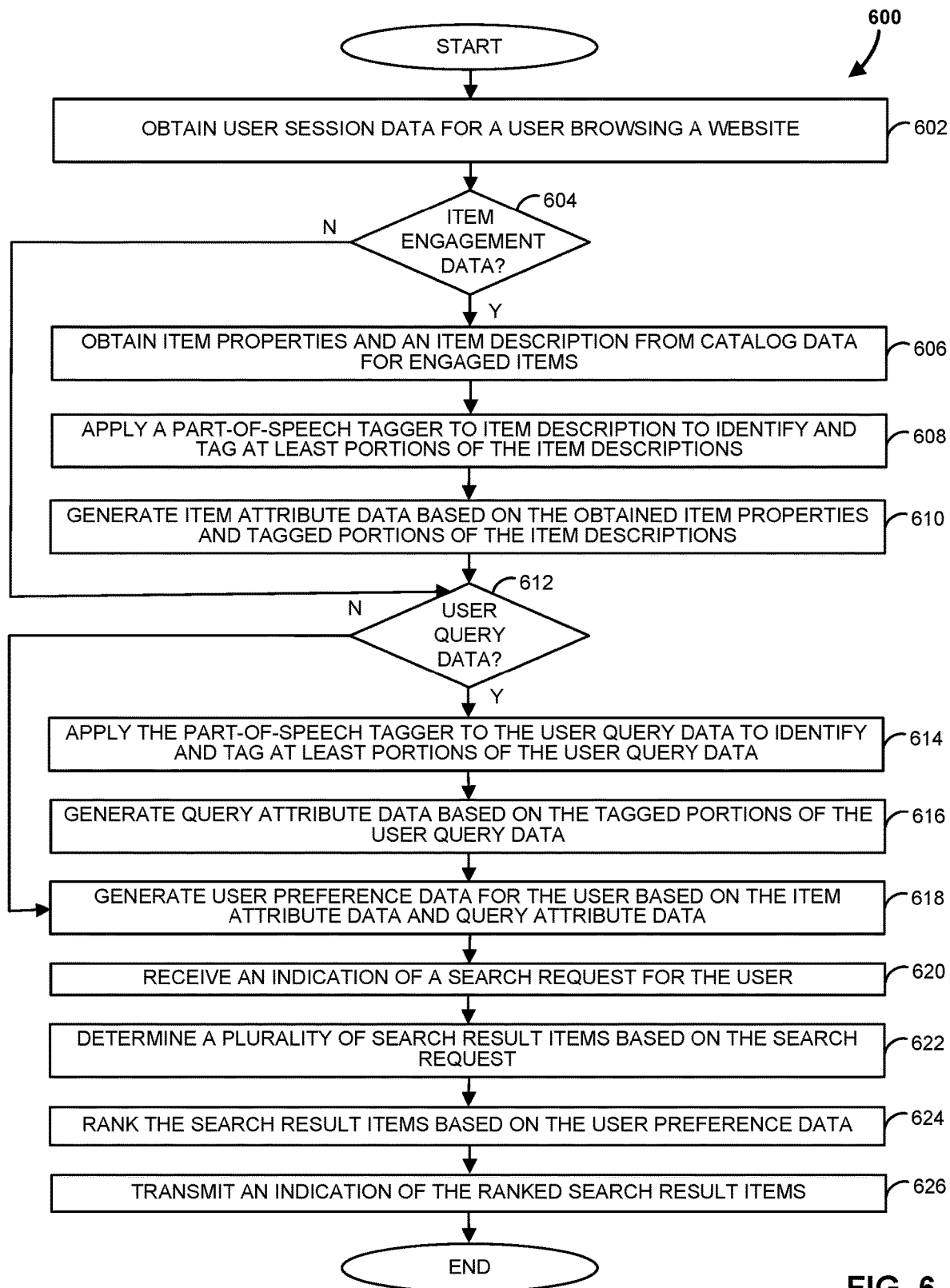
FIG. 6 is a flowchart of an example method that can be carried out by the search result customization system of FIG. 1 in accordance with some embodiments.

FIG. 6 is a flowchart of an example method 600 that can be carried out by the search result customization system 100 of FIG. 1. Beginning at step 602, a computing device, such as search result customization computing device 102, obtains user session data for a user browsing a website. For example, search result customization computing device 102 may obtain user session data 320 for a user browsing a website hosted by web server 104. At step 604, a determination is made as to whether item engagement data is received. For example, search result customization computing device 102 may determine if, for the user, item engagement data 360 is available in database 116. If item engagement data is not available for the user, the method proceeds to step 612. Otherwise, if item engagement data is available for the user, the method proceeds to step 606, where item properties and an item description is obtained from catalog data for all engaged items. For example, search result customization computing device 102 may identify one or more items engaged by the user based on the item engagement data 360, and may obtain item brand 374, item type 376, and item description 378 for each of the engaged items from catalog data 310 stored in database 116.

Proceeding to step 608, search result customization computing device 102 applies a part-of-speech tagger to the item descriptions to identify and tag at least portions of the item descriptions, such as nouns and adjective modifiers. At step 610, item attribute data is generated based on the obtained item properties and tagged portions of the item descriptions. The method then proceeds to step 612.

At step 612, a determination is made as to whether user query data for the user has been received. For example, search result customization computing device 102 may determine whether a search request 310 has been received from web server 104 for the user. If no user query data has been received for the user, the method proceeds to step 618. Otherwise, if user query data has been received for the user, the method proceeds to step 614, where the part-of-speech tagger is applied to the user query data to identify and tag at least portions of the user query data. The method then proceeds to step 616, where query attribute data is generated for the user based on the tagged portions of the user query data identified in step 614. The method proceeds to step 618, where user preference data is generated based on any available item attribute data and query attribute data. For example, search result customization computing device 102 may generate user preference data 312 for the user identifying and characterizing attributes based on item attribute data and query attribute data for the user, and may store the user preference data 312 in database 116.

Proceeding to step 620, an indication of a search request is received for the user. For example, search result customization computing device 102 may receive a search request 310 from web server 104 for the user. At step 622, a plurality of search result items are determined based on the search request. For example, search result customization computing device 102 may employ one or more search algorithms to identify search result items based on the received search request. The method then proceeds to step 624, where the search result items are ranked based on the user preference data for the user. At step 626, the ranked search result items are transmitted. For example, search result customization computing device 102 may transmit ranked search results 312 to web server 104. Web server 104 may display the ranked search results to the user. The method then ends.

Figure 7:
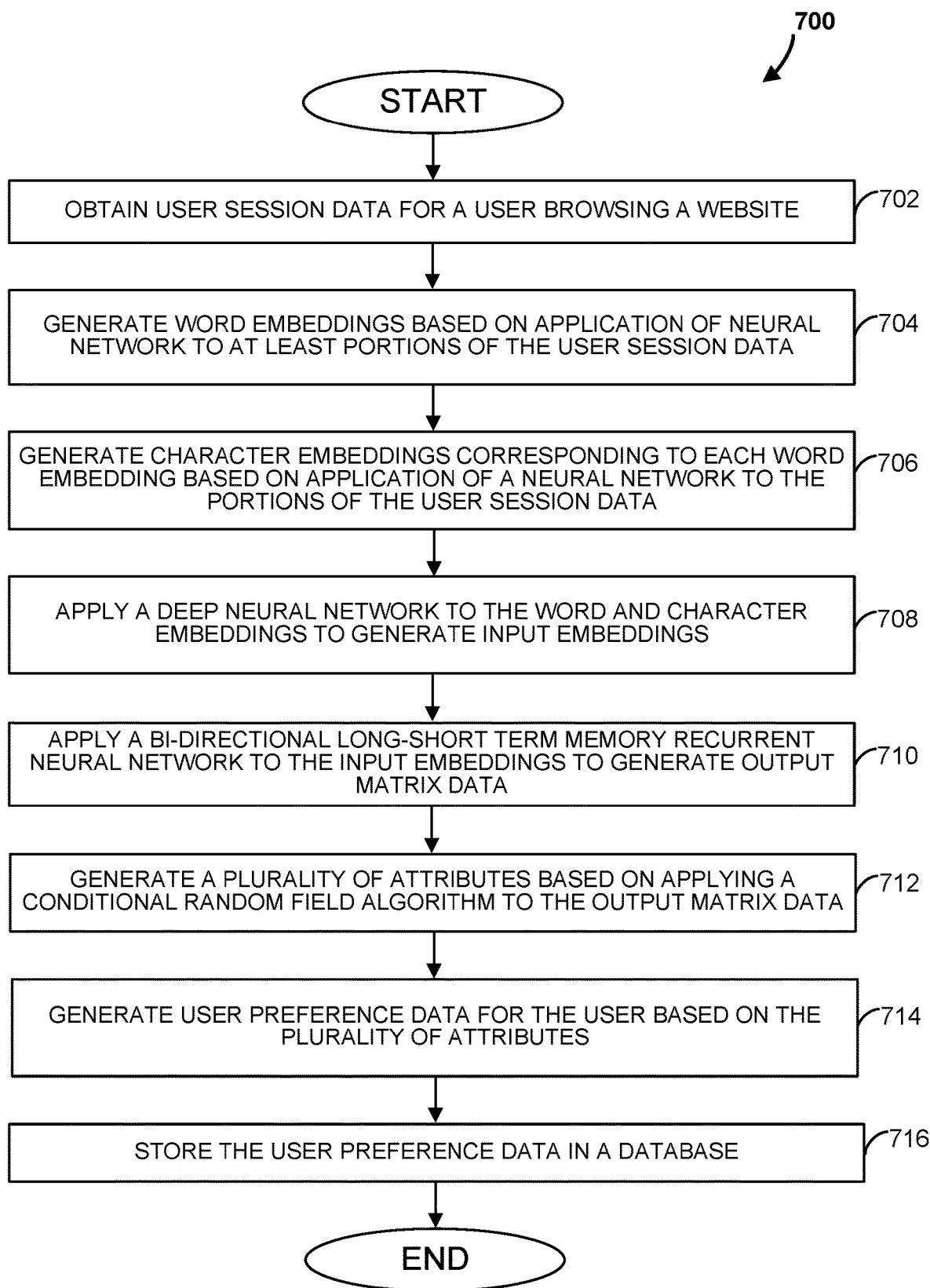
FIG. 7 is a flowchart of another example method that can be carried out by the search result customization system of FIG. 1 in accordance with some embodiments.

FIG. 7 is a flowchart of an example method 700 that can be carried out by the search result customization system 100 of FIG. 1. At step 702, a computing device, such as search result customization computing device 102, obtains user session data for a user browsing a website. The method proceeds to step 704, where the computing device generates word embeddings based on the application of a neural network to at least portions of the user session data. Proceeding to step 706, the computing device generates character embeddings based on application of a neural network, such as a CNN, to the same portions of the user session data. The method then proceeds to step 708, where input embeddings are generated based applying a deep neural network, such as a bidirectional symmetrical deep neural network, to encode each word embedding with its corresponding character embedding. For example, the computing device may generate one vector for each word embedding and corresponding character embedding.

At step 710, the computing device applies a bi-directional LSTM recurrent neural network to the input embeddings to generate output matrix data. At step 712, a plurality of attributes are generated based on applying a CRF algorithm to the output matrix data. At step 714, user preference data, such as user preference data 312, is generated based on the plurality of attributes. At step 716, the user preference data is stored in a database, such as database 116. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   a memory resource, storing instructions; and
   one or more processors coupled to the memory resource, the one or more processors being configured to execute the instructions to:
   obtain a session data of a user, the session data identifying and characterizing one or more previous instances the user engaged, via a computing device of the user, with each item of a set of items provided by a retailer;
   obtain, from catalogue data, item property data associated with a previously engaged item of the set of items;
   determine at least portion of the item property data for the previously engaged item based on one or more words associated with the previously engaged item;
   receive, from the computing device of the user via a server, a search request identifying a plurality of search terms for a currently searched item, the currently searched item being engaged with by the user subsequent to the previously engaged item;
   generate a plurality of word embeddings and a plurality of character embeddings for the session data of the user, the catalogue data, and the plurality of search terms of the search request by applying a first neural network;
   apply a second neural network to combine each of the plurality of word embeddings to the each of the corresponding plurality of character embeddings;
   apply a third neural network to the output of the second neural network and in response to applying the third neural network, generate first attribute data identifying an attribute of the previously engaged item based on the determined at least portion of the item property data and associate the first attribute data with the user;
   and based at least on the first attribute data and the search request, generate search results.

2. The system of claim 1, wherein the computing device is configured to:
   based at least on the search request, implement a set of operations that generate second attribute data, the set of operations including:
   determining at least portion of the plurality of search terms based on applying a dependency parser to the plurality of search terms;
   generating second attribute data identifying at least a second attribute based on the determined at least portion of the plurality of search terms; and
   storing the first attribute data and the second attribute data in a database.

3. The system of claim 2, wherein determining the at least portion of the plurality of search terms comprises determining at least one noun and at least one adjective of the plurality of search terms.

4. The system of claim 2, wherein generating the search results for the search request includes:
   ranking the search results based on at least one of the first attribute data and the second attribute data; and
   transmitting the ranked search results to the server.

5. The system of claim 2, wherein the dependency parser is a part-of-speech tagger.

6. The system of claim 1, wherein the at least portion of the item property data comprises an item description for the previously engaged item.

7. The system of claim 1, wherein the session data identifies that the previously engaged item has been viewed.

8. The system of claim 1, wherein determining the at least portion of the item property data for the previously engaged item comprises determining at least one item type.

9. A method comprising:
   obtaining a session data of a user, the session data identifying and characterizing one or more previous instances the user engaged, via a computing device of the user, with each item of a set of items provided by a retailer;

obtaining, from catalogue data, item property data associated with a previously engaged item of the set of items;

determining at least portion of the item property data for the previously engaged item based on one or more words associated with the previously engaged item;

receiving, from the computing device of the user via a server, a search request identifying a plurality of search terms for a currently searched item, the currently searched item being engaged with by the user subsequent to the previously engaged item;

generating a plurality of word embeddings and a plurality of character embeddings for the session data of the user, the catalogue data, and the plurality of search terms of the search request by applying a first neural network;

applying a second neural network to combine each of the plurality of word embeddings to the each of the corresponding plurality of character embeddings;

applying a third neural network to the output of the second neural network and in response to applying the third neural network, generate first attribute data identifying an attribute of the previously engaged item based on the determined at least portion of the item property data and associate the first attribute data with the user; and based at least on the first attribute data and the search request, generating search results.

10. The method of claim 9, further comprising:

based at least on the search request, implementing a set of operations that generate second attribute data, the set of operations including:

determining at least portion of the plurality of search terms based on applying a dependency parser to the plurality of search terms;

generating second attribute data identifying at least a second attribute based on the determined at least portion of the plurality of search terms; and storing the first attribute data and the second attribute data in a database.

11. The method of claim 10, wherein determining the at least portion of the plurality of search terms comprises determining at least one noun and at least one adjective of the plurality of search terms.

12. The method of claim 10, wherein generating the search results for the search request includes:

ranking the search results based on at least one of the first attribute data and the second attribute data; and transmitting the ranked search results to the server.

13. The method of claim 9, wherein the at least portion of the item property data comprises an item description for the previously engaged item.

14. The method of claim 9, wherein determining the at least portion of the item property data for the previously engaged item comprises determining at least one item type.

15. A non-transitory computer readable medium having instructions stored thereon, wherein the instructions, when executed by at least one processor, cause a device to perform operations comprising:

obtaining a session data of a user, the session data identifying and characterizing one or more previous instances the user engaged, via a computing device of the user, with each item of a set of items provided by a retailer;

obtaining, from catalogue data, item property data associated with a previously engaged item of the set of items; determining at least portion of the item property data for the previously engaged item based on one or more words associated with the previously engaged item;

receiving, from the computing device of the user via a server, a search request identifying a plurality of search terms for a currently searched item, the currently searched item being engaged with by the user subsequent to the previously engaged item;

generating a plurality of word embeddings and a plurality of character embeddings for the session data of the user, the catalogue data, and the plurality of search terms of the search request by applying a first neural network;

applying a second neural network to combine each of the plurality of word embeddings to the each of the corresponding plurality of character embeddings;

applying a third neural network to the output of the second neural network and in response to applying the third neural network, generate first attribute data identifying an attribute of the previously engaged item based on the determined at least portion of the item property data and associate the first attribute data with the user; and based at least on the first attribute data and the search request, generating search results.

16. The non-transitory computer readable medium of claim 15, further comprising instructions stored thereon that, when executed by the at least one processor, further cause the device to perform operations comprising:

based at least on the search request, implementing a set of operations that generate second attribute data, the set of operations including:

determining at least portion of the plurality of search terms based on applying a dependency parser to the plurality of search terms;

generating second attribute data identifying at least a second attribute based on the determined at least portion of the plurality of search terms; and storing the first attribute data and the second attribute data in a database.

17. The non-transitory computer readable medium of claim 16, further comprising instructions stored thereon that, when executed by the at least one processor, further cause the device to perform operations comprising determining at least one noun and at least one adjective of the plurality of search terms.

18. The non-transitory computer readable medium of claim 16, wherein generating the search results for the search request includes:

ranking the search results based on at least one of the first attribute data and the second attribute data; and transmitting the ranked search results to the server.

19. The non-transitory computer readable medium of claim 15, wherein the at least portion of the item property data comprises an item description for the previously engaged item.

20. The non-transitory computer readable medium of claim 15, further comprising instructions stored thereon that, when executed by the at least one processor, further cause the device to perform operations comprising determining at least one item type for the previously engaged item based on application of a dependency parser to the item property data.

* * * * *

UNITED STATES PATENT AND TRADEMARK OFFICE
CERTIFICATE OF CORRECTION

| | | |
|---|---|---|
| PATENT NO. | : 12,019,639 B2 | |
| APPLICATION NO. | : 18/101188 | |
| DATED | : June 25, 2024 | |
| INVENTOR(S) | : Rahul Iyer et al. | |

It is certified that error appears in the above-identified patent and that said Letters Patent is hereby corrected as shown below:

In the Claims

Claim 1, Column 16, Line 22, delete first instance of the word "the" and insert --an--

Claim 9, Column 17, Line 19, delete first instance of the word "the" and insert --an--

Claim 15, Column 18, Line 17, delete first instance of the word "the" and insert --an--

Signed and Sealed this
Twentieth Day of August, 2024

Katherine Kelly Vidal
*Director of the United States Patent and Trademark Office*